(12) United States Patent
Wilson et al.

(10) Patent No.: US 12,228,694 B2
(45) Date of Patent: Feb. 18, 2025

(54) SYSTEMS AND METHODS FOR RADIO FREQUENCY SENSING OF SEISMIC EVENTS

(71) Applicant: Eagle Technology, LLC, Melbourne, FL (US)

(72) Inventors: Arthur G. Wilson, Melbourne, FL (US); Vivek Krishna, West Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 357 days.

(21) Appl. No.: 17/669,669

(22) Filed: Feb. 11, 2022

(65) Prior Publication Data
US 2023/0258840 A1 Aug. 17, 2023

(51) Int. Cl.
| | | |
|---|---|---|
| *G01V 3/12* | (2006.01) | |
| *H04B 7/185* | (2006.01) | |
| *H04W 56/00* | (2009.01) | |

(52) U.S. Cl.
CPC .......... *G01V 3/12* (2013.01); *H04B 7/18519* (2013.01); *H04W 56/005* (2013.01)

(58) Field of Classification Search
CPC .... G01V 3/12; H04B 7/18519; H04W 56/005
See application file for complete search history.

(56) References Cited

U.S. PATENT DOCUMENTS

| | | | |
|---|---|---|---|
| 4,684,929 A | 8/1987 | Edwards et al. | |
| 5,398,885 A | 3/1995 | Andersson et al. | |
| 7,277,797 B1 * | 10/2007 | Kunitsyn | G01V 1/01 |
| | | | 702/15 |
| 9,989,553 B2 | 6/2018 | Waters et al. | |
| 10,234,476 B2 | 3/2019 | Waters et al. | |
| 10,371,510 B2 | 8/2019 | Imai | |
| 2003/0122681 A1 * | 7/2003 | Luan | H01L 21/67253 |
| | | | 340/673 |

(Continued)

FOREIGN PATENT DOCUMENTS

RU 2231090 C1 * 6/2004

OTHER PUBLICATIONS

Science Learning Hub, "Satellite Communications", Mar. 27, 2013, www.sciencelearn.org.nz/resources/270-satellite-communications (Year: 2013).*

(Continued)

*Primary Examiner* — Catherine T. Rastovski
*Assistant Examiner* — Yossef Korang-Beheshti
(74) *Attorney, Agent, or Firm* — Fox Rothschild LLP; Carol E. Thorstad-Forsyth

(57) ABSTRACT

Systems and methods for detecting or predicting a seismic event. The methods comprise, by a system: receiving at least one communication signal using a carrier recovery component with a fixed location remote from a source of the at least one communication signal; determining at least one of (i) phase deviations of the at least one communication signal over time and (ii) differential propagation delays over two paths which the at least one communication signal traveled; performing operations to detect patterns in at least one of the phase deviations and differential propagation delays that indicate an occurrence of seismic activity with level(s) of confidence; and using the level(s) of confidence to detect or predict the seismic event.

18 Claims, 7 Drawing Sheets

(56) References Cited

U.S. PATENT DOCUMENTS

2012/0123983 A1* 5/2012 Flexer ............... G01V 1/01
    706/15
2019/0250292 A1 8/2019 Vibert-Charbonnel et al.

OTHER PUBLICATIONS

Tutorials Point, "Satellite Communication—Quick Guide", Nov. 27, 2018, web.archive.org/web/20181127031748/https://www.tutorialspoint.com/satellite_communication/satellite_communication_quick_guide.htm (Year: 2018).*
Massimiliano Pieraccini, "Ground-Based Radar Interferometry: A Bibliographic Review", www.mdpi.com/2072-4292/11/9/1029, Apr. 23, 2019 (Year: 2019).*
https://earthquake.usgs.gov/?force_isolation=true accessed on Feb. 9, 2022.
https://www.theverge.com/2021/4/28/22407676/google-expands-android-earthquake-detection-system?force_isolation=true accessed Feb. 9, 2022.
https://sismo.app/?force_isolation=true accessed Feb. 9, 2022.
https://www.engadget.com/2016-02-12-earthquake-detecting-android-app.html?force_isolation=true (UC Berkeley, 2016).
https://agupubs.onlinelibrary.wiley.com/doi/10.1029/2021AV000407?force_isolation=true accessed Feb. 9, 2022.
Paul Bennett: "Structural Testing issues and advances related to structural testing", Oct. 2013.
Rice et al.: "A wireless multifunctional radar-based displacement sensor for structural health monitoring", Proceedings of SPIE—The International Society for Optical Engineering, Mar. 2011.
Alexander Amies: "A non-contact structural health monitoring method based on radio frequency signal analysis", Thesis, University of Canterbury(2018).
Ummenhofer et. al.: "Practical investigation of using passive radar for structural health monitoring of wind farms", 2018 IEEE International Conference on Environmental Engineering (EE), Mar. 12-14, 2018.
Miccinesi et al.: "Monostatic/Bistatic Interferometric Radar for Monitoring Slander Structures", 2019 IEEE Conference on Antenna Measurements & Applications (CAMA), Oct. 23-25, 2019.
Vincent et al.: "Inter-sensor propagation delay estimation using sources of opportunity", Signal Processing, vol. 118, Jan. 2016, pp. 248-258.
Takano et al.: "Detection of Microwave Frequency Signals from Earthquakes and Volcanic Activities", American Geophysical Union, Fall Meeting 2008, abstract id. S13C-1837.
Monodini et al.: "Landslide failures detection and mapping using Synthetic Aperture Radar: Past, present and future", Earth-Science Reviews vol. 216, May 2021.
Synthetic-aperture radar, https://en.wikipedia.org/wiki/Synthetic-aperture_radar accessed Feb. 9, 2022.
Elliott et al.: "The role of space-based observation in understanding and responding to active tectonics and earthquakes", Nature Communications, Dec. 22, 2016.

* cited by examiner

SYSTEMS AND METHODS FOR RADIO FREQUENCY SENSING OF SEISMIC EVENTS

BACKGROUND

Statement of the Technical Field

The present document concerns sensing systems. More particularly, the present document relates to systems and methods for Radio Frequency (RF) sensing of seismic events.

Description of the Related Art

There is a network of seismographs deployed across the globe. Each seismograph is an instrument used to record the motion of the ground during a seismic event such as an earthquake, volcanic eruption, or explosion. The ground motion may be caused by seismic or elastic waves in the Earth produced by an earthquake or other means. Each seismograph has a timing device, a recording device and a seismometer. The seismometer comprises a mass attached to a fixed base coupled mechanically to the Earth. During a seismic event, the base moves relative to the mass. The motion of the base is transformed into an electrical voltage. The recording device records or otherwise logs the electrical voltage values along with timestamps. The seismographs have a limited capability to detect low level events in distant inaccessible geographic locations.

There is also a smartphone software application based on seismometer networks. This software application relies on crowdsourced sensing and is not practical for inaccessible geographic areas.

SUMMARY

This document concerns implementing systems and methods for detecting or predicting a seismic event. The methods comprise performing the following operations by a system: receiving communication signal(s) using carrier recovery component(s) at fixed location(s) remote from source(s) of the communication signal(s); determining (i) phase deviations of the communication signal(s) over time and/or (ii) differential propagation delays over two paths which each communication signal traveled; performing operations to detect patterns in the phase deviations and/or differential propagation delays that indicate an occurrence of seismic activity with level(s) of confidence; and using the level(s) of confidence to detect or predict the seismic event.

In some scenarios, the communication signal(s) comprise(s) a signal transmitted from a source located at or near the location of the seismic activity. The source can include, but is not limited to, a satellite ground station, a base station or a broadcast station.

In those or other scenarios, the methods also comprise: receiving a plurality of communication signals at the system; and selecting the communication signal(s) from the plurality of communication signals based on signal frequency, signal types and/or signal content. The phase pattern deviations may be detected using a machine learning algorithm. The seismic event may be detected or predicted using a combination of a level confidence determined based on the phase deviations and a level of confidence determined based on the differential propagation delays. More specifically, both use cases may be based on changes in phase of a received signal due to changes in propagation time delays caused by changes in distance between the signal or reflected path (if using differential multipath) and a sensor.

In those or other scenarios, active monostatic radar/LaDAR sensing is also performed to detect phase shifts in a signal over time and to detect a pattern in the phase shifts that indicate an occurrence of seismic activity with another level of confidence. The seismic event is detected or predicted additionally using the another level of confidence. Additionally or alternatively, the method further comprises performing operations by the system to cause a robotic system to take an action for addressing the seismic event which was detected or predicted.

In those or other scenarios, the phase deviations result from physical motion of a structure excited by a seismic or acoustic wave. Additionally or alternatively, the communication signal comprises a satellite communication signal which was emitted from a ground station affected by the seismic event and retransmitted by a satellite over a downlink channel.

The implementing sensor systems comprise a carrier recovery component and a circuit. The carrier recovery component is configured to receive at least one communication signal. The carrier recovery component has a fixed location remote from a source of the communication signal. The communication signal may comprise a signal transmitted from a source located at or near the location of the seismic activity. The source can include, but is not limited to, a satellite ground station, a base station or a broadcast station. The circuit is configured to: determine (i) phase deviations of the communication signal over time and/or (ii) differential propagation delays over two paths which the communication signal traveled; detect patterns in the phase deviations and/or differential propagation delays that indicate an occurrence of seismic activity with level(s) of confidence; and using the level(s) of confidence to detect or predict the seismic event.

The carrier recovery component may also be configured to: receive a plurality of communication signals; and select the communication signal from the plurality of communication signals based on signal frequency, signal types and/or signal content. The pattern may be detected using a machine learning algorithm. The seismic event may be detected or predicted using a combination of a confidence level determined based on deviations of the phase deviations and a level of confidence determined based on the differential propagation delays.

The circuit may also be further configured to perform active monostatic radar/LaDAR sensing to detect phase shifts in a signal over time and to detect a pattern in the phase shifts that indicate an occurrence of seismic activity with another level of confidence. The seismic event may be detected or predicted by additionally using the second source of level of confidence. Additionally or alternatively, the circuit is configured to cause a robotic system to take an action for addressing the seismic event which was detected or predicted.

This document also concerns implementing systems and methods for detecting or predicting a seismic event using a direct passive phase change measurement approach. The methods comprise: receiving a communication signal at a system having a carrier recovery component with a fixed location remote from a location of a source of the communication signal; using, by the system, the communication signal to generate a highly stable reference signal; determining, by the system, phase deviations in the communication signal over time by comparing the communication signal to the reference signal; performing, by the system, operations to detect a pattern in the phase deviations that indicates occurrence of the seismic activity with a level of confidence; and use, by the system, the level of confidence to detect or predict the seismic event.

The communication signal may comprise a signal transmitted from a source located at the location of the seismic activity. The source may include, but is not limited to, a ground station, a base station or a broadcast station. The pattern may be detected using a machine learning algorithm. The method may also comprise: receiving a plurality of communication signals at the system; selecting the communication signal from the plurality of communication signals based on location of the selected emitter, signal frequency, signal types and/or signal content; and/or causing a robotic system to take an action for addressing the seismic event which was detected or predicted.

This document further concerns implementing systems and methods for detecting or predicting a seismic event using a passive bistatic radar sensing approach. The methods comprise: receiving a direct communication signal and a reflected communication signal by carrier recovery components with fixed locations remote from locations of sources of the direct and reflected communication signals; determining, by a signal processor, differential propagation delays over two paths which a communication signal traveled based on the direct communication signal and the reflected communication signal; performing, by the signal processor, operations to detect a pattern in the differential propagation delays that indicates an occurrence of the seismic activity with a level of confidence; using the level of confidence to detect or predict the seismic event; and/or performing operations to cause a robotic system to take an action for addressing the seismic event which was detected or predicted.

The direct communication signal may comprise a signal transmitted from a source located at the location of the seismic activity. The source may include, but is not limited to, a base station or a broadcast station. The pattern may be detected using a machine learning algorithm.

BRIEF DESCRIPTION OF THE DRAWINGS

This disclosure is facilitated by reference to the following drawing figures, in which like numerals represent like items throughout the figures.

DETAILED DESCRIPTION

Figure 1:
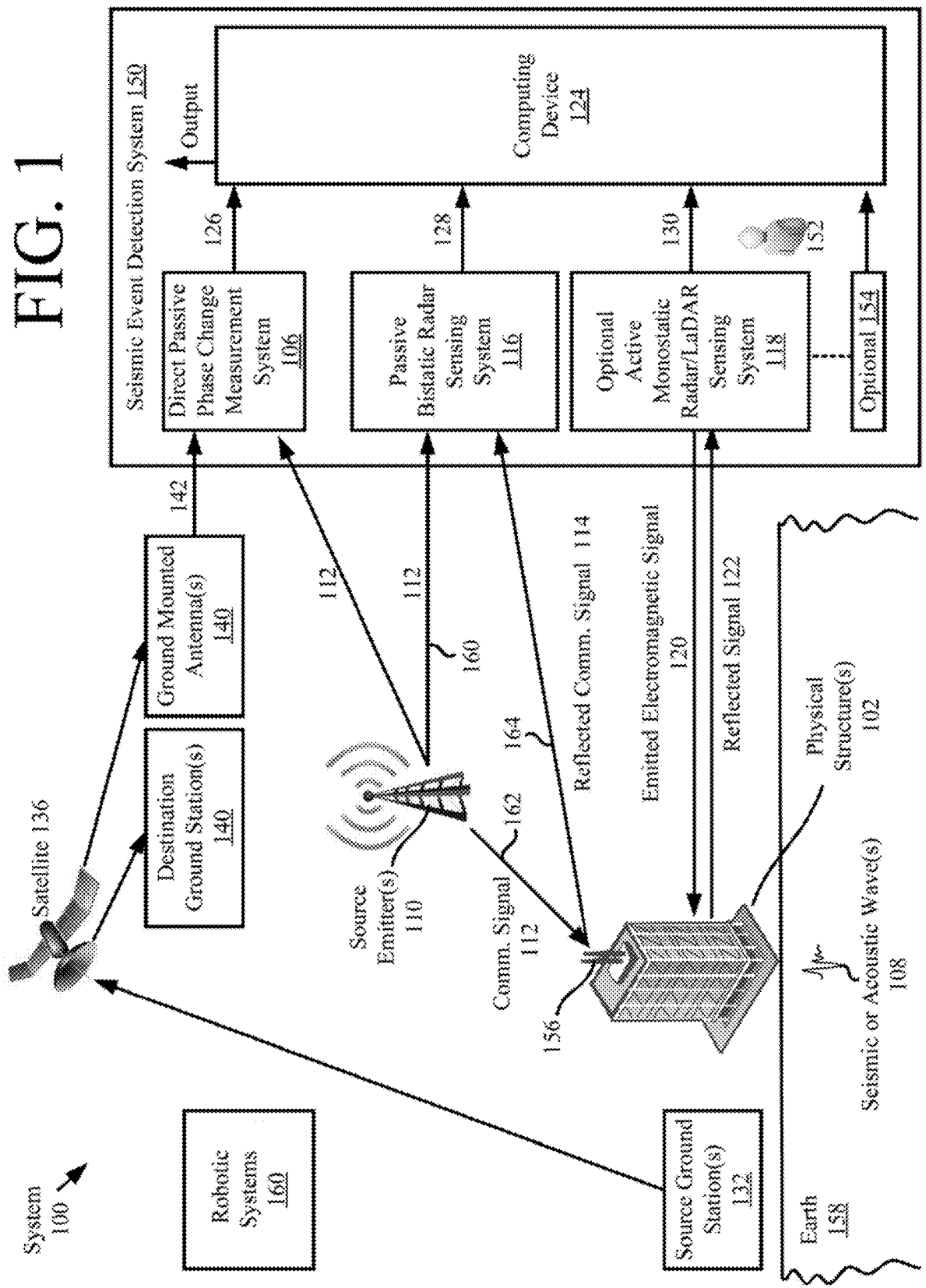
FIG. 1 provides an illustration of a system.

It will be readily understood that the solution described herein and illustrated in the appended figures could be implemented in a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

There is a need to detect low level seismic activity at large distances from the actual locations thereof. The present solution provides a novel way of making such detections using existing infrastructure in the environment. The novel solution generally involves: detecting slight changes in distances between emitters and remote sense carrier recovery components based on change in received signal characteristics (e.g., phase changes, differential propagation delay changes, and/or phase shifts) resulting from the emitters' physical movements caused by seismic activity; and/or using communication signals existing in the environment through a signal degradation source normally ignored or compensated for in communication systems. The particulars of the present solution will become more evident as the discussion progresses.

Physical structures are known to move as seismic or acoustic waves travel thereunder in the Earth. The physical structures can include, but are not limited to, buildings, towers, and bridges. The movement of the physical structures include, but are not limited to, deflection and vibration. The movement can be detected using various sensors (e.g., accelerometers, strain-gauges, Linear Variable Differential Transformers (LVDTs), fiber optic sensing equipment, and/or radar-based displacement sensors) mounted on the physical structures. However, a technique is needed that does not require such sensors at the actual locations of the seismic activity and/or physical structures.

The present solution provides a novel means for detecting movement of physical structures using a direct measurement-based sensing technology and/or a passive bistatic radar sensing technology alone or in combination with radar-based sensing technologies and/or LaDAR-based sensing technologies). The radar-based sensing technologies requires physical short-range access to the structure being monitored. The radar-based sensing technologies include Active Monostatic Radar (AMR) sensing systems and Passive Bistatic Radar (PBR) sensing systems. The LaDAR-based sensing technologies include Active Monostatic LaDAR (AML) sensing systems. In an AMR or AML sensing system, a signal sis emitted from a transmitter and reflected off a reflecting target (e.g., a building or bridge). A portion of the energy returns to a receiver which is collocated with the transmitter. The transmitted and received signals are compared to each other to detect changes in one or more signal characteristics. In a PBR sensing system, there is no dedicated radar transmitter. A receiver receives direct path emissions from communications transmitters as a reference signal and uses reflected emissions to detect targets. The direct measurement-based sensing technology includes, but is not limited to, passive sensing devices that measure changes in a phase of a communications signal (e.g., a broadcast, data link or other signal). Each of these technologies will be discussed in further detail below.

Referring now to FIG. 1, there is provided an illustration of a system 100 implementing the present solution. System 100 is generally configured to detect seismic activity at large distances from the actual locations thereof. Such detection is made using one or more of the following techniques at any given time which do not employ sensors at the actual locations of the seismic activity and/or physical structures: direct passive phase change measurement; and passive bistatic radar sensing; and active monostatic radar/LaDAR sensing. Accordingly, system 100 comprises a seismic event detection system 150 including a direct passive phase change measurement system 106, and a passive bistatic radar sensing system 116, and an active monostatic radar/LaDAR sensing system 118. The present solution is not limited to the architecture shown in FIG. 1. For example, in the case that only direct passive phase change measurement is employed to detect or predict seismic events, system 100 could be absent of systems 116 and 118. Similarly, in the case that only passive bistatic radar sensing is employed to detect or predict seismic events, system 100 could be absent of 106 and 118, and so on. Also, other techniques (e.g., a group of sensors) can be employed as shown by block 154 for further facilitating the detection or prediction of seismic events.

During operation, seismic activity causes a seismic or acoustic wave(s) 108 to travel in the Earth 158 underneath source emitter(s) 110, ground station(s) 132 and/or other physical structure(s) 102 (e.g., building(s) and/or bridge(s)) supporting antenna(s) 156. The seismic or acoustic wave(s) 108 cause(s) the physical structure(s) 102, 110, 132 to shake, rattle, vibrate, sway, deflect or otherwise move. Systems 106, 116, 118, 154 are configured to correlate these movements of components 102, 110, 132 to seismic activity occurrences. In this regard, it should be understood that the physical structure movements cause at least (i) the distance between the source emitter(s) 110 and fixed antennas of systems 106, 116 to change in real time, (ii) the distance between antenna(s) 156 and fixed antennas of systems 116, 118 to change in real time, and/or (iii) the distance between the source ground station(s) 132 and ground mounted antenna(s) 140 coupled to system 106 to change in real time. The fixed antennas of systems 106, 116, 118 are physically stable during occurrences of seismic activity since they are located remote from the geographic locations where the seismic activity occur. Thus, the movements of components 102, 110, 132, 156 are detectable via changes in characteristics of signals received by systems 106, 116, 118 (e.g., phase changes, phase shifts and/or differential propagation delays in signal paths).

The direct passive phase change measurement system 106 is generally configured to receive a communication signal 112 emitted from a source emitter 110 (e.g., a base station or a broadcast station) and/or a communication signal 142 transmitted from a source ground station 132 to a destination ground station 140 via a frequency translating satellite 136. The received signal(s) is(are) filtered and processed to determine and track phase deviations in the signal(s) over time. The filtering can be performed to remove any effects of wind or other non-seismic event/factors. The phase changes are then analyzed by a machine learning algorithm to (i) detect patterns therein indicating that seismic activity occurred with certain level(s) of confidence and/or (ii) an amount/degree/duration of seismic activity. The level(s) of confidence can be expressed in any format such as a numerical format (e.g., between zero and ten, where zero indicates the lowest level of confidence that seismic activity occurred, and ten indicates the highest level of confidence that seismic activity occurred). Similarly, the amount/degree/duration of seismic activity can be expressed in any format such as a numerical format.

The level(s) of confidence, amount/degree and/or duration of seismic activity may be provided as a seismic event indicator 126 to the computing device 124 for facilitating a final decision as to whether a seismic event has been detected by system 100 or whether a seismic event (e.g., an earthquake) is predicted by system 100 to occur within a given amount of time. For example, in the case that only the output of system 106 is to be used in detecting/predicting seismic events, computing device 124 may make a final decision that a seismic event occurred or is predicted to occur when the seismic event indicator 126 is equal to or greater than a threshold value (e.g., level of confidence≥thr1 (e.g., 5), amount/degree of seismic activity≥thr2, and/or duration of seismic activity≥thr3). Otherwise, a final decision is made that a seismic event did not occur or is not precited to occur within the given amount of time. The present solution is not limited to the particulars of this example.

If the final decision indicates that a seismic event occurred or is predicted to occur, then the computing device 124 can perform various operations to respond to the detected/predicted seismic event. Such operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems 160 to perform remedial actions responsive to the detected/predicted seismic event. The robotic systems 160 can include, but are not limited to, autonomous vehicles, semi-autonomous vehicles and/or teleoperated vehicles. The vehicles can include, but is not limited to, land vehicle(s), aircraft(s), watercraft(s), subterrene(s), and/or spacecraft(s). The remedial actions can include, but are not limited to, delivering food, delivering medical supplies, (re)moving debris, and/or air lifting individuals from the location(s) of seismic event(s).

The passive bistatic radar sensing system 116 is generally configured to receive the communication signal 112 emitted from a source emitter 110 (e.g., a base station or a broadcast station) as well as a reflected communication signal 114. The reflected communication signal 114 includes at least a portion of signal 112 which was reflected off a physical structure 102. These two received signals 112, 114 may be filtered in system 116 to remove any effects of wind or other non-seismic events/factors.

The signals are then processed to determine the differential propagation delay between the two signal paths 160 and 162/164. Under non-seismic conditions, this differential delay will be stable. During a seismic event, however, the differential delay will be modulated by the relative physical mechanical motion between the source and reflecting structures. The differential propagation delay is used to determine (i) a confidence level for seismic activity occurrence and/or (ii) an amount, degree and/or duration of seismic activity. The confidence level can have any format such as a numerical format (e.g., between zero and ten, where zero indicates the lowest level of confidence that seismic activity occurred, and ten indicates the highest level of confidence that seismic activity occurred). Similarly, the amount/degree/duration of seismic activity can have any format such as a numerical format.

The confidence level, amount/degree and/or duration of seismic activity may be provided as a seismic event indicator 128 to the computing device 124 for facilitating a final decision as to whether a seismic event has been detected by system 100 or whether a seismic event is predicted to occur in a given amount of time. If the final decision indicates that a seismic event occurred or is predicted to occur, then the computing device 124 can perform various operations to respond to the detected/predicted seismic event. Such operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems 160 to perform remedial actions responsive to the detected/predicted seismic event. The robotic systems 160 can include, but are not limited to, autonomous vehicles, semi-autonomous vehicles and/or teleoperated vehicles. The vehicles can include, but is not limited to, land vehicle(s), aircraft(s), watercraft(s), subterrene(s), and/or spacecraft(s). The remedial actions can include, but are not limited to, delivering food, delivering medical supplies, (re)moving debris, and/or air lifting individuals from the location(s) of seismic event(s).

In some scenarios, only the output of system 116 is to be used to detect a seismic event. Computing device 124 may make a final decision that a seismic event occurred when the seismic event indicator is equal to or greater than a threshold value (e.g., level of confidence≥thr1 (e.g., 5), amount/degree of seismic activity≥thr2, and/or duration of seismic activity≥thr3). Otherwise, a final decision is made that a seismic event did not occur. The present solution is not limited to the particulars of these scenarios. In some scenarios, the computing device 124 output information relating to the final decision to an external user and/or external device (e.g., robotic systems 160). The information can include, but are not limited to, alerts and/or control signals.

In other scenarios, the outputs of systems 106 and 116 are both to be used to detect a seismic event. Computing device 124 may make a final decision that a seismic event occurred when an average or a weighted average of the seismic event indicators 126, 128 is equal to or greater than a threshold value (e.g., an average or weighted average level of confidence≥thr1 (e.g., 5), an average or weighted average amount/degree of seismic activity≥thr2, and/or an average or weighted average duration of seismic activity≥thr3). Otherwise, a final decision is made that a seismic event did not occur. The present solution is not limited to the particulars of these scenarios.

The active monostatic radar/LaDAR sensing system 118 is generally configured to emit an electromagnetic signal 120 and receive a reflected signal 122. The signals 118, 120 are compared to each other to detect phase shifts over time. The phase shifts are used to determine (i) a confidence level for seismic activity occurrence and/or (ii) an amount, degree and/or duration of the seismic activity. The confidence level can have any format such as a numerical format (e.g., between zero and ten, where zero indicates the lowest level of confidence that a seismic activity occurred and ten indicates the highest level of confidence that seismic activity occurred). Similarly, the amount/degree/duration of seismic activity can have any format such as a numerical format.

The confidence level, amount/degree and/or duration of seismic activity may be provided as a seismic event indicator 130 to the computing device 130 for facilitating a final decision as to whether a seismic event has been detected by system 100 or is predicted to occur within a given amount of time. If the final decision indicates that a seismic event occurred or is predicted to occur, then the computing device 124 can perform various operations to respond to the detected/predicted seismic event. Such operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems 160 to perform remedial actions responsive to the detected/predicted seismic event. The robotic systems 160 can include, but are not limited to, autonomous vehicles, semi-autonomous vehicles and/or teleoperated vehicles. The vehicles can include, but is not limited to, land vehicle(s), aircraft(s), watercraft(s), subterrene(s), and/or spacecraft(s). The remedial actions can include, but are not limited to, delivering food, delivering medical supplies, (re)moving debris, and/or air lifting individuals from the location(s) of seismic event(s).

In some scenarios, the final decision can be made using seismic event indicator 130 alone. Computing device 124 may make a final decision that a seismic event occurred when the seismic event indicator 130 is equal to or greater than a threshold value (e.g., a level of confidence≥thr1 (e.g., 5), an amount/degree of seismic activity≥thr2, and/or a duration of seismic activity≥thr3). Otherwise, a final decision is made that a seismic event did not occur. The present solution is not limited to the particulars of these scenarios.

In other scenarios, the seismic event indicator 130 is used with seismic event indicator 126 and/or 128 to make the final decision as to whether a seismic event has been detected by system 100. For example, the computing device 124 may make a final decision that a seismic event occurred by: computing an average or a weighted average of seismic event indicators 126/130, 128/130 or 126/128/130; and comparing the computed average or weighted average to a threshold value. A final decision is made that a seismic event occurred when the average or weighted average seismic event indicator is equal to or exceeds the threshold value (e.g., an average or weighted average level of confidence≥thr1 (e.g., 5), an average or weighted average amount/degree of seismic activity≥thr2, and/or an average or weighted average duration of seismic activity>thr3). Otherwise, a decision is made that a seismic event did not occur. The present solution is not limited to the particulars of these scenarios.

The final decision can be made by the computing device 124 with or without human input by an individual 152 using computing device 124. A machine learning algorithm can trained to make the final decision based on outputs from one or more systems 106, 116, 118, . . . , 154.

Figure 2:
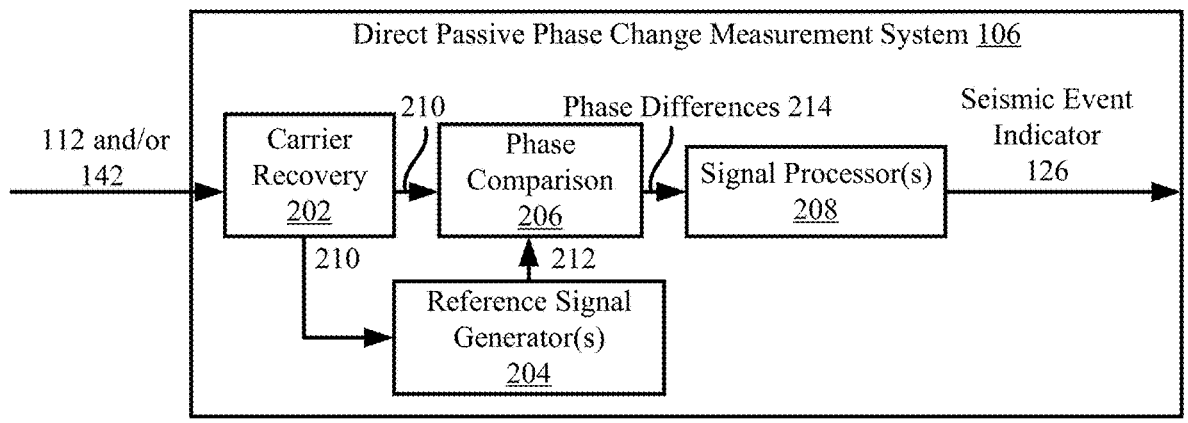
FIG. 2 provides a more detailed block diagram of the direct passive phase change measurement system shown in FIG. 1.

A more detailed block diagram of the direct passive phase change measurement system 106 is provided in FIG. 2. As shown in FIG. 2, system 106 comprises carrier recovery component(s) 202, reference signal generator(s) 204, phase comparison component(s) 206 and signal processor(s) 208. Each of the listed components 202, 204, 206 is well known. Carrier recovery component(s) 202 may filter the signal(s) 112, 142 to remove any effects of wind or other non-seismic events/factors therefrom. The optionally filtered signal(s) 210 is(are) passed to downstream components 204, 206.

Each reference signal generator 204 comprises a Phase Locked Loop (PLL) that generates a reference signal 212 from signal 210. Reference signal 212 has a range of frequencies narrower than that of the respective received signal 112 or 142. Any known demodulation technique can be used in the PLL for obtaining the reference signal. The signal 210 is compared to the locally generated reference signal 212 by comparator 206 to determine phase differences 214 over time. The phase differences 214 are passed to the signal processor 208.

The signal processor 208 implements a machine learning algorithm that is trained (i) to detect patterns in phase deviations over time that indicate occurrences of seismic activity with certain levels of confidence and (ii) to determine an amount, degree and/or duration of the seismic activity based on the phase deviations. The machine learning algorithm(s) can include, but is(are) not limited to, a supervised learning algorithm, an unsupervised learning algorithm, and/or a semi-supervised algorithm. Each of the listed machine learning algorithms are well known in the art, and therefore will not be described herein. Any known or to be known machine learning algorithm can be used herein without limitation. For example, a Recursive Neural Network (RNN) or Convolutional Neural Network (CNN) is employed by signal processor 208. The present solution is not limited to the listed types of neural networks.

In some scenarios, system 106 is configured to receive and process both signals 112 and 142. Thus, system 106 is not limited to the architecture shown in FIG. 2. A separate branch of components 202-208 can be provided for each signal 112 and 142. Each branch is configured in accordance with the type of signal to be received and processed thereby.

In those or other scenarios, system 106 receives a plurality of signals 112 or 142 and selects one of the received signals for further processing. This selection can be made by carrier recovery component 202 based on various information such as signal frequencies, types of communication signal, and/or contents of the signals. For example, the received signal with the highest frequency is selected for use in determining whether seismic activity occurred. The other received signals may be discarded. The present solution is not limited to the particulars of this example.

Figure 3:
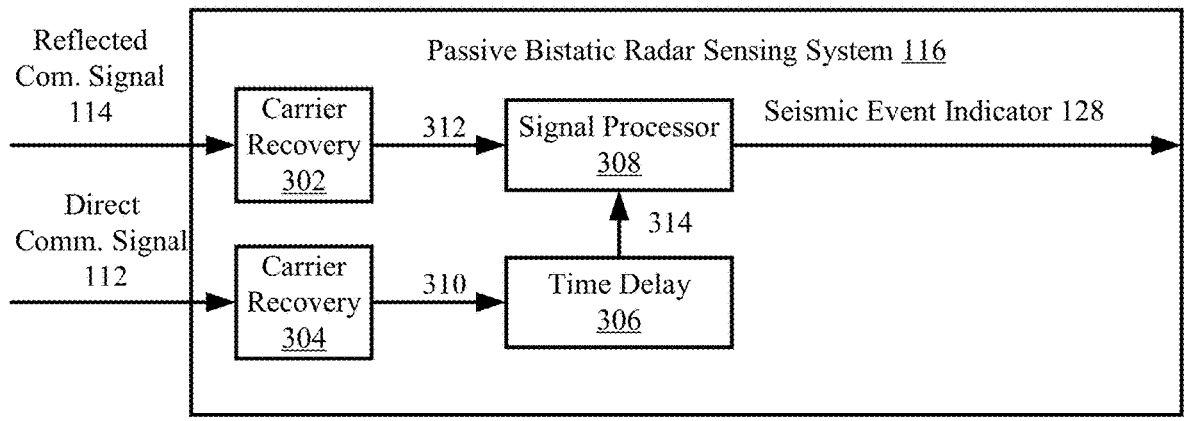
FIG. 3 provides a more detailed block diagram of the passive bistatic radar sensing system shown in FIG. 1.

A more detailed block diagram of the passive bistatic radar sensing system 116 is provided in FIG. 3. As shown in FIG. 3, system 116 comprises carrier recovery components 302, 304, a time delay 308, and a signal processor 308. Each of the listed components 302-306 is well known.

Carrier recovery component 304 is configured to receive the direct communication signal 112, and carrier recovery component 302 is configured to receive the reflected communication signal 114. Carrier recovery components 302, 304 may filter the signals 112, 114 to remove any effects of wind or other non-seismic events/factors therefrom. The optionally filtered signals 310, 312 are then passed to downstream components 306, 308. The direct communication signal 310 is delayed by time delay 306. The time delayed signal 314 is passed to signal processor 308.

Signal processor 308 is configured to: determine a differential propagation delay between the two signal paths 160 and 162/164 of FIG. 1 using signals 312, 314; determine a level of confidence that seismic activity occurred based on the differential propagation delay; determine an amount, degree and/or duration of seismic activity based on the differential propagation delay; and/or output the level of confidence, amount/degree and/or duration of seismic activity as a seismic event indicator 128. The signal processor 308 can implement a machine learning algorithm that is trained (i) to detect patterns in differential propagation delays over time that indicate occurrences of seismic activity with certain levels of confidence and (ii) to determine an amount, degree and/or duration of the seismic activity based on the differential propagation delays. The machine learning algorithm(s) can include, but is(are) not limited to, a supervised learning algorithm, an unsupervised learning algorithm, and/or a semi-supervised learning algorithm. Each of the listed machine learning algorithms are well known in the art, and therefore will not be described herein. Any known or to be known machine learning algorithm can be used herein without limitation. For example, an RNN and/or CNN may be employed by signal processor 308. The present solution is not limited to the listed types of neural networks.

Figure 4:
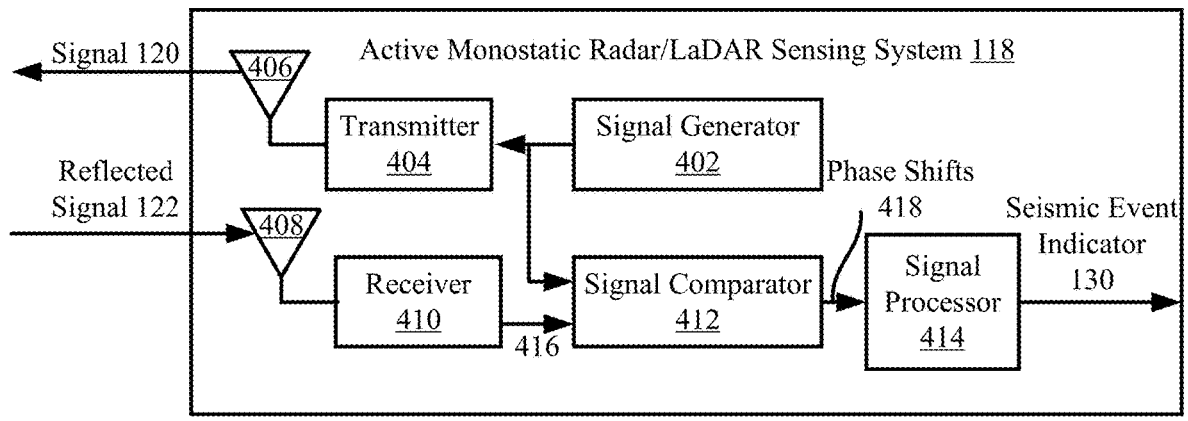
FIG. 4 provides a more detailed block diagram of the active monostatic radar sensing system shown in FIG. 1.

A more detailed block diagram of the active monostatic radar/LaDAR sensing system 118 is provided in FIG. 4. As shown in FIG. 4, system 118 comprises a signal generator 402, a transmitter 404, antennas 406, 408, a receiver 410, a signal comparator 412 and a signal processor 414. Each of the listed components 402-412 is well known. A signal 120 is generated by and transmitted from system 118 via components 402-406. A reflected signal 122 is received by system 118 via components 408-410. Receiver 410 may filter reflected signal 122 to remove any effects of wind or other non-seismic events/factors therefrom. The optionally filtered reflected signal 416 is passed to signal comparator 412.

The transmitted signal 120 and the reflected signal 416 are compared to each other in block 412 to determine phase shifts 416 over time. The phase shifts 416 are provided to signal processor 414. Signal processor 414 implements a machine learning algorithm that is trained (i) to detect patterns in phase shifts over time that indicate occurrences of seismic activity with certain levels of confidence and (ii) to determine an amount, degree and/or duration of the seismic activity based on the phase shifts. The machine learning algorithm(s) can include, but is(are) not limited to, a supervised learning algorithm, an unsupervised learning algorithm, and/or a semi-supervised algorithm. Each of the listed machine learning algorithms are well known in the art, and therefore will not be described herein. Any known or to be known machine learning algorithm can be used herein without limitation. For example, an RNN or CNN may be employed by signal processor 414. The present solution is not limited to the listed types of neural networks.

Figure 5:
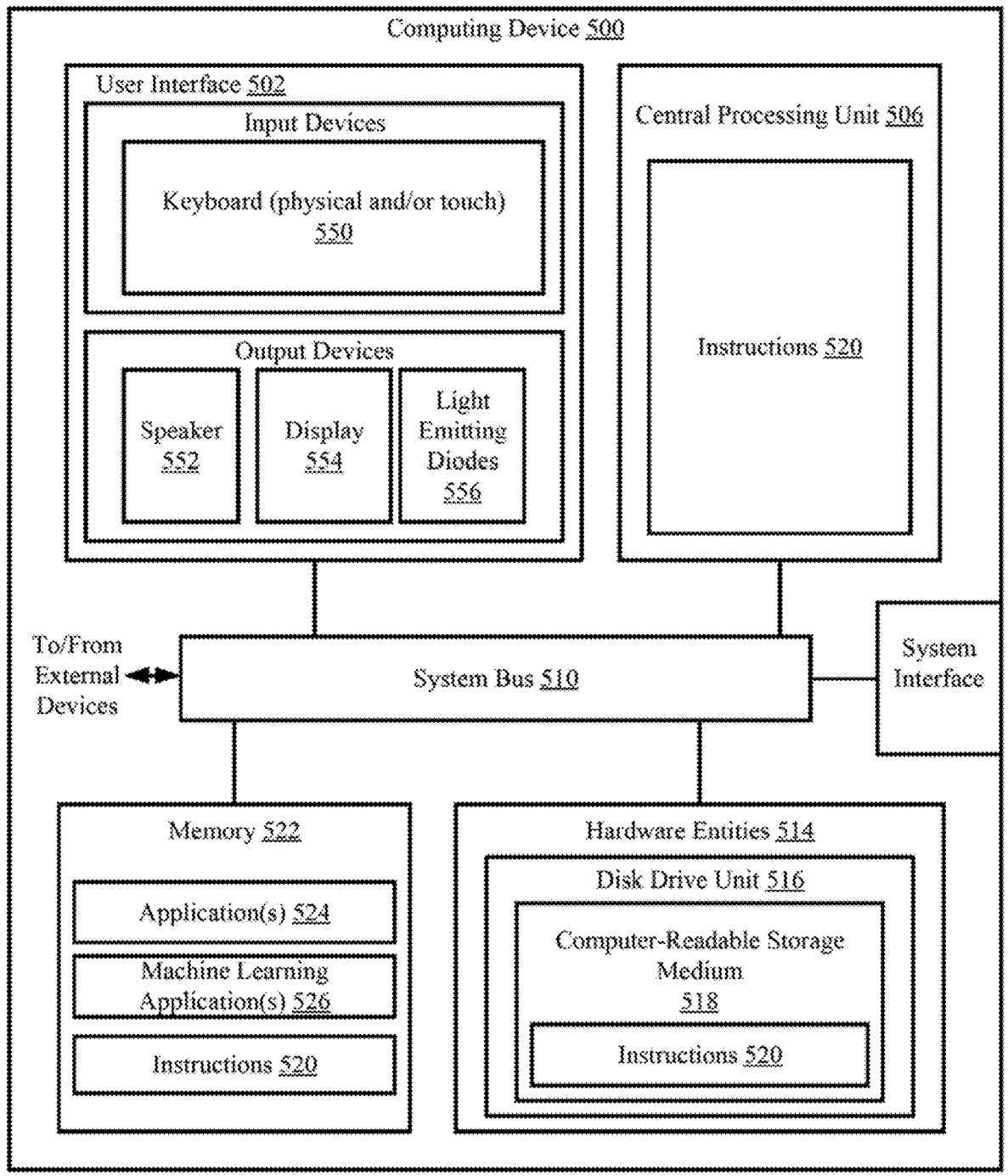
FIG. 5 provide an illustration of a computing device.

Referring now to FIG. 5, there is provided a detailed diagram of a computing device 500. Computing devices 124 of FIG. 1, reference signal generator 204 of FIG. 2, signal processor 208 of FIG. 2, signal processor 308 of FIG. 2, signal generator 402 of FIG. 4, and/or signal processor 414 of FIG. 4 can be the same as or substantially similar to computing device 500. As such, the discussion of computing device 500 is sufficient for understanding communication devices 124, 204, 208, 308, 402, 414 of FIG. 1.

Computing device 500 may include more or less components than those shown in FIG. 5. However, the components shown are sufficient to disclose an illustrative solution implementing the present invention. The hardware architecture of FIG. 5 represents one implementation of a representative computing device configured to enable seismic event detection as described herein. As such, the computing device 500 of FIG. 5 implements at least a portion of the method(s) described herein.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit (CPU) 506, a system bus 510, a memory 522 connected to and accessible by other portions of computing device 500 through system bus 510, and hardware entities 514 connected to system bus 510. The user interface can include input devices (e.g., a keypad 550) and output devices (e.g., a speaker 552, a display 554, and/or light emitting diodes 556), which facilitate user-software interactions for controlling operations of the computing device 500.

At least some of the hardware entities 514 perform actions involving access to and use of memory 522, which can be a RAM, a disk driver and/or a Compact Disc Read Only Memory (CD-ROM). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 522 and/or within the CPU 506 during execution thereof by the computing device 500. The memory 522 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

In some scenarios, the hardware entities 514 include an electronic circuit (e.g., a processor) programmed for facilitating the detection of seismic events. In this regard, it should be understood that the electronic circuit can access and run application(s) 524 and/or a machine learning application(s) 526 installed on the computing device 500.

The machine learning application(s) 526 implements Artificial Intelligence (AI) that provides the computing device 500 with the ability to automatically learn and improve data analytics from experience without being explicitly programmed. The machine learning application(s) employ(s) one or more machine learning algorithms that learn various information from accessed data (e.g., via pattern recognition and prediction making). Machine learning algorithms are well known in the art, and therefore will not be described herein in detail. Any known or to be known machine learning algorithm can be used herein without limitation. For example, in some scenarios, the machine learning application 526 employs a supervised learning algorithm, an unsupervised learning algorithm, and/or a semi-supervised algorithm. The learning algorithm(s) is(are) used to model seismic events decisions based on data analysis (e.g., captured sensor information and other information).

Figure 6:
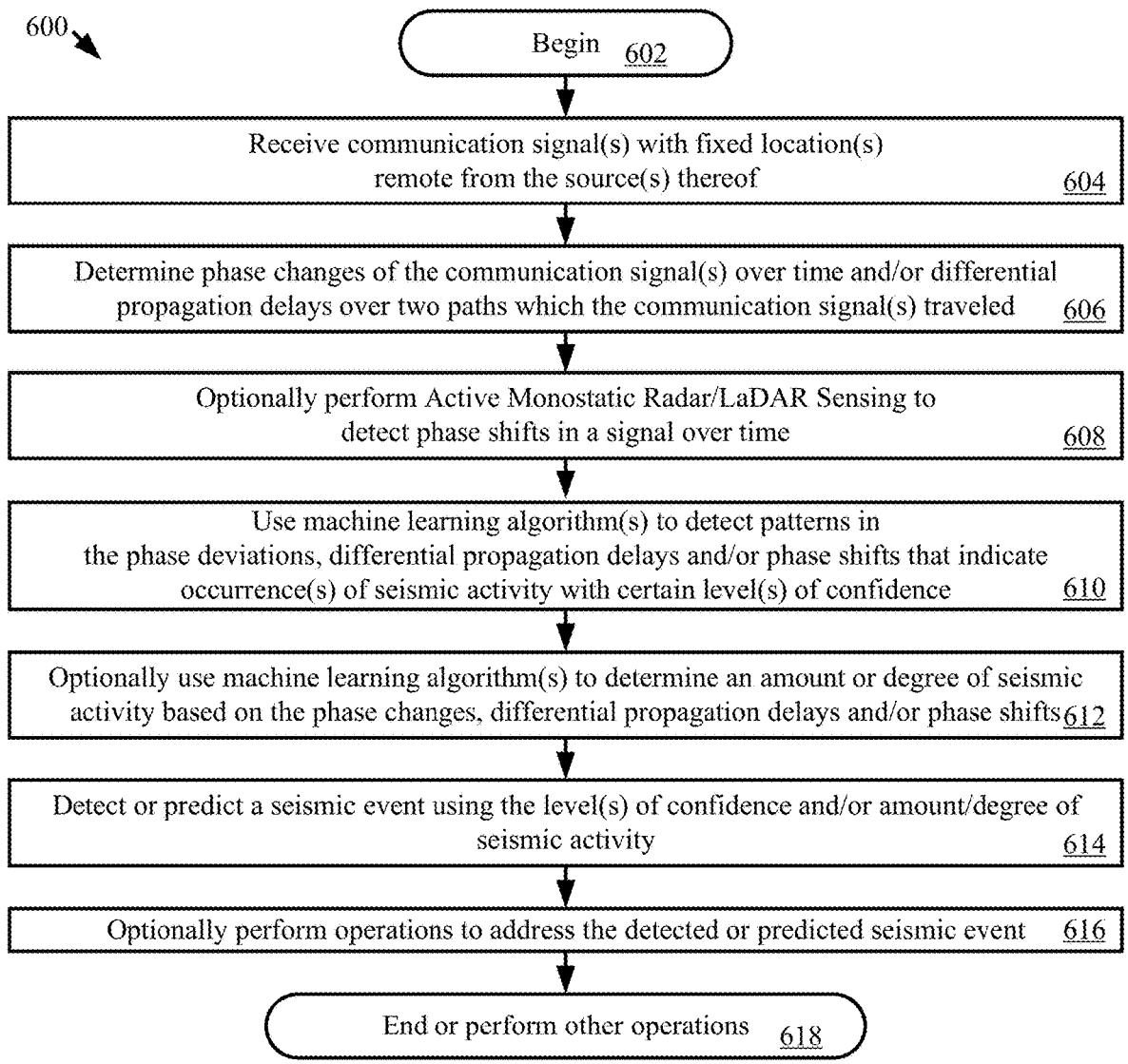
FIGS. 6-8 each provides a flow diagram of an illustrative method for detecting a seismic event.

Referring now to FIG. 6, there is provided a flow diagram of an illustrative method 600 for detecting seismic events. Method 600 begins at 602 and continues with 604 where communication signal(s) (e.g., signal(s) 112, 114 and/or 142 of FIG. 1) is(are) received at carrier recovery component(s) (e.g., carrier recovery component(s) 202 of FIG. 2, 302 of FIG. 3 and/or 204 of FIG. 3). The carrier recovery component(s) has(have) fixed location(s) remote from the location(s) of the source(s) of the communication signal(s) (e.g., source emitter(s) 110, antenna(s) 156 and/or source ground station(s) 132 of FIG. 1). In 606, the system(s) (e.g., system 106 and/or 116 of FIGS. 1-3) perform(s) operations to determine phase changes (e.g., phase differences 214 of FIG. 2) of the communication signal(s) over time and/or differential propagation delays over two paths (e.g., paths 160 and 162/164 of FIG. 1) which the communication signal(s) traveled. The system may also optionally perform active monostatic radar/LaDAR sensing to detect phase shifts (e.g., phase shifts 418 of FIG. 4) in a signal (e.g., signal 120 of FIG. 1) over time, as shown by 608.

In 610, the system performs machine learning algorithm(s) to detect patterns in the phase deviations, differential propagation delays and/or phase shifts that indicate occurrence(s) of seismic activity with certain level(s) of confidence. The machine learning algorithm(s) may also be used to determine an amount, degree and/or duration of seismic activity based on the phase deviations, differential propagation delays and/or phase shifts, as shown by 612.

In 614, the system (e.g., computing device 124 of FIG. 1) performs operations to detect or predict a seismic event using the level(s) of confidence and/or amount/degree of seismic activity. If a seismic event is detected/predicted, then the system may perform operations in block 616 to address the detected/predicted seismic event. Such operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems (e.g., robotic systems 160 of FIG. 1) to perform remedial actions responsive to the detected/predicted seismic event. The remedial actions can include, but are not limited to, delivering food, delivering medical supplies, (re) moving debris, and/or air lifting individuals from the location(s) of seismic event(s). Subsequently, 618 is performed where method 600 ends or other operations are performed (e.g., return to 602).

Figure 7:
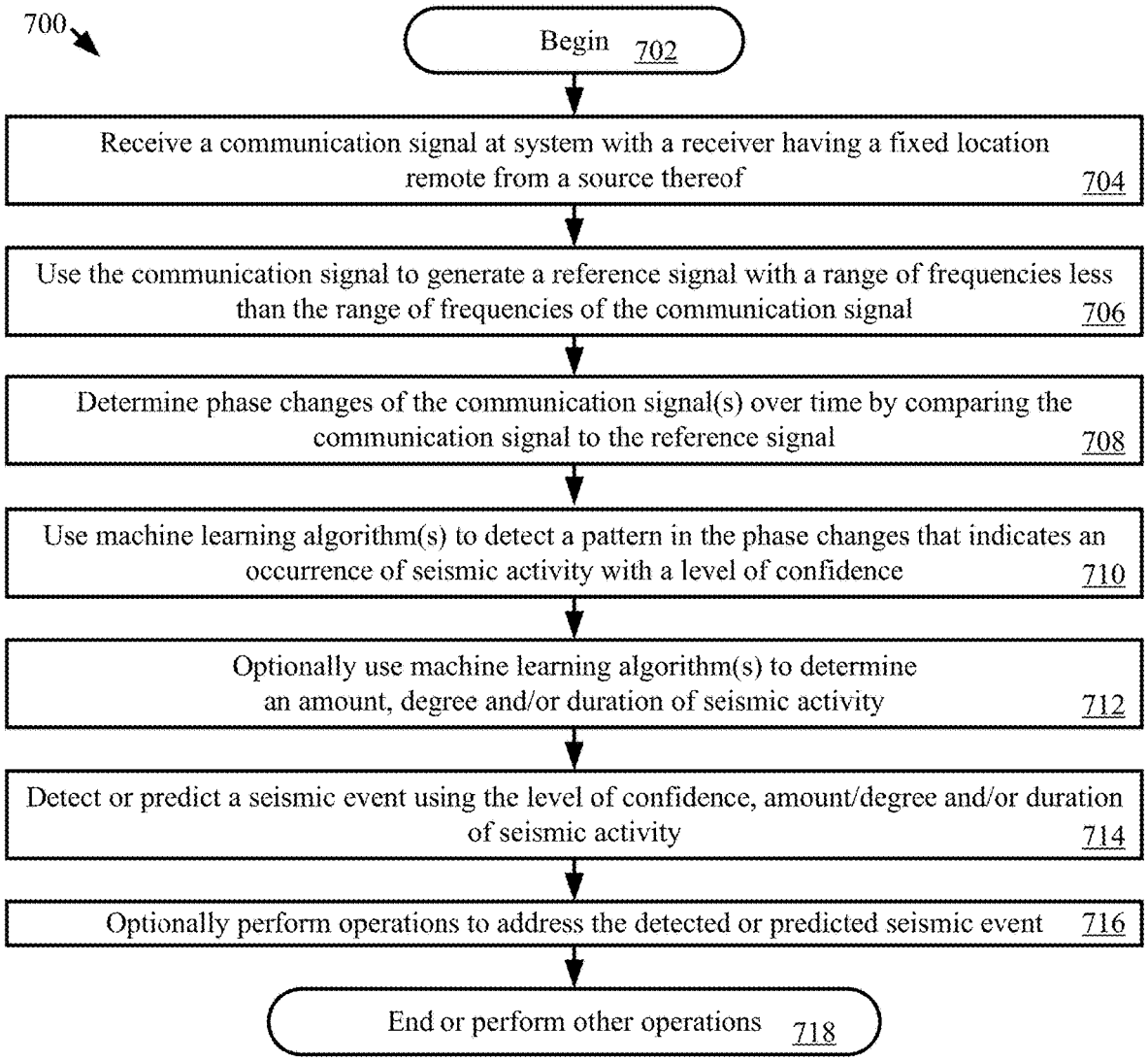

Referring now to FIG. 7, there is provided a flow diagram of a method for detecting or predicting a seismic event using a direct passive phase change measurement approach. Method 700 begins with 702 and continues with 704 where a system (e.g., system 106 of FIG. 1) receives a communication signal (e.g., signal 112 or 142 of FIG. 1). The system has a carrier recovery component (e.g., carrier recovery component 202 of FIG. 2) with a fixed location remote from a location of the source (e.g., source emitter 110 or source ground station 132 of FIG. 1) of the communication signal. In some scenarios, the system receives a plurality of communication signals in 704, and selects one of the communication signals for further processing based on signal source location, signal frequency, signal types and/or signal content.

The communication signal is used in 706 to generate a stable reference signal (e.g., reference signal 212 of FIG. 2) with a range of carrier offset frequencies less than the range of offset frequencies of the communication signal. In 708, the system determines phase changes in the communication signal over time by comparing the recovered carrier from the communication signal to the reference signal. A machine learning algorithm is used in 710 to detect a pattern in the phase deviations that indicates an occurrence of seismic activity with a level of confidence. The machine learning algorithm(s) may also be used to determine an amount, degree and/or duration of seismic activity, as shown by 712. In 714, the system detects or predicts a seismic event using the level of confidence, amount/degree and/or duration of seismic activity.

Operations may optionally be performed in 716 to address the detected or predicted seismic event. These operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems (e.g., robotic system 160 of FIG. 1) to perform remedial actions responsive to the detected/predicted seismic event. The remedial actions can include, but are not limited to, delivering food, delivering medical supplies, (re)moving debris, and/or air lifting individuals from the location(s) of seismic event(s). Subsequently, 718 is performed where method 700 ends or other operations are performed (e.g., return to 702).

Figure 8:
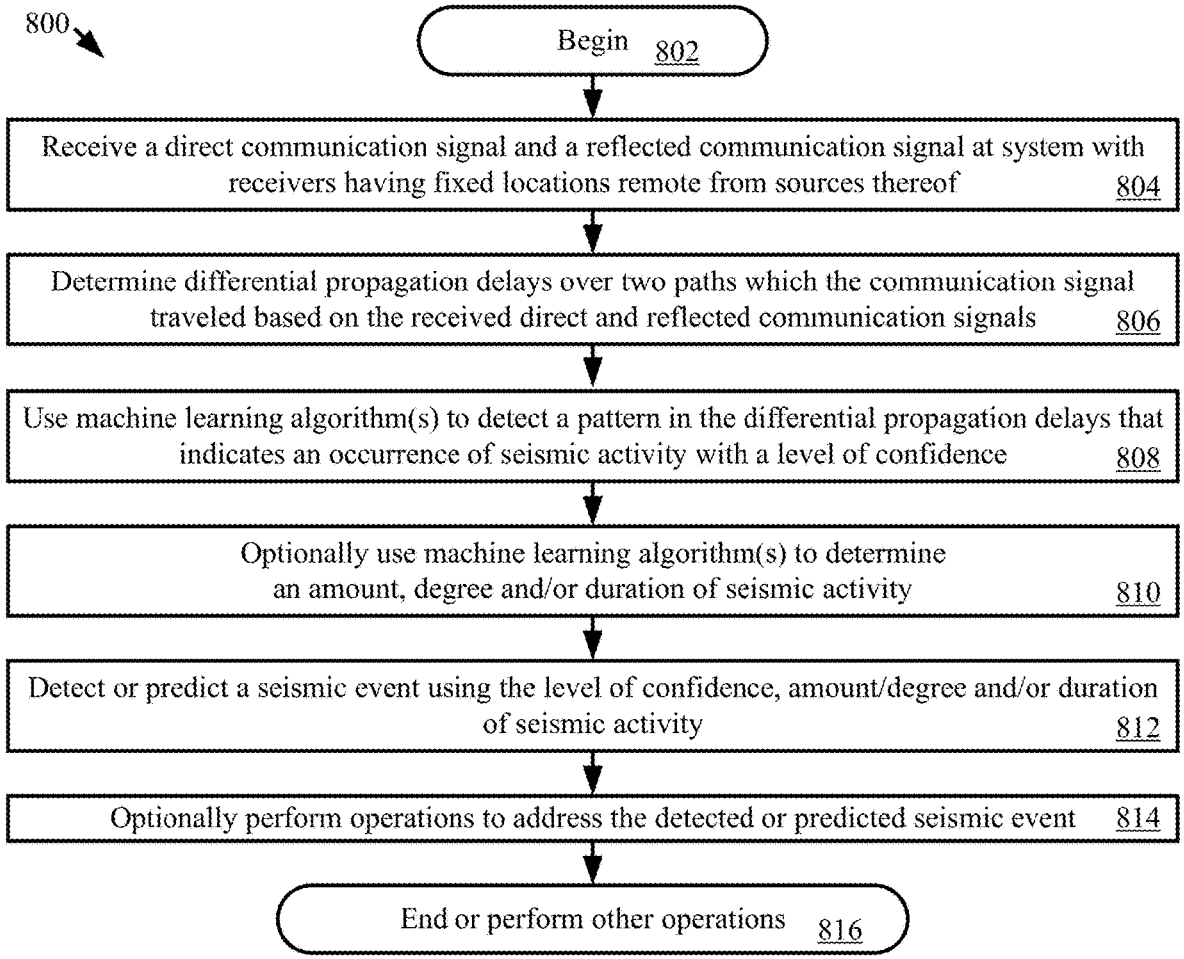

Referring now to FIG. 8, there is provided a flow diagram of a method 800 for detecting or predicting a seismic event using a passive bistatic radar sensing approach. Method 800 begins with 802 and continues with 804 where a system (e.g., system 116 of FIG. 1 and FIG. 3) receives a direct communication signal (e.g., signal 112 of FIG. 1) and a reflected communication signal (e.g., signal 114 of FIG. 1) by carrier recovery components (e.g., carrier recovery components 302, 304 of FIG. 3). The carrier recovery components have fixed locations remote from locations of sources (e.g., source emitter 110 of FIG. 1 and/or antennas 156 of FIG. 1) of the direct and reflected communication signals. In 806, the system determines differential propagation delays over two paths (e.g., paths 160 and 162/164 of FIG. 1) which the communication signal travels based on the received direct and reflected communication signals.

In 808, a signal processor (e.g., signal processor 308 of FIG. 3) performs operations to detect a pattern in the differential propagation delays that indicates an occurrence of the seismic activity with a level of confidence. The pattern can be detected using machine learning algorithm(s). The machine learning algorithm(s) may also be used to determine an amount, degree and/or duration of seismic activity, as shown by 810. The level of confidence, amount/degree and/or duration of the seismic activity is then used in 812 to detect or predict a seismic event.

Operations can optionally be performed in 814 to address the detected or predicted seismic event. These operations can include, but are not limited to, alerting emergency responders and others individuals of the detected/predicted seismic events, causing emergency responders to be dispatched to the location(s) of the seismic event(s), causing supplies to be dispatched or otherwise provided (e.g., via autonomous robotic systems) to individual(s) at locations of the detected/predicted seismic event(s), and/or remotely controlling or causing robotic systems (e.g., robotic system 160 of FIG. 1) to perform remedial actions responsive to the detected/predicted seismic event. The remedial actions can include, but are not limited to, delivering food, delivering medical supplies, (re)moving debris, and/or air lifting individuals from the location(s) of seismic event(s). Subsequently, 816 is performed where method 800 ends or other operations are performed (e.g., return to 802).

Figure 9:
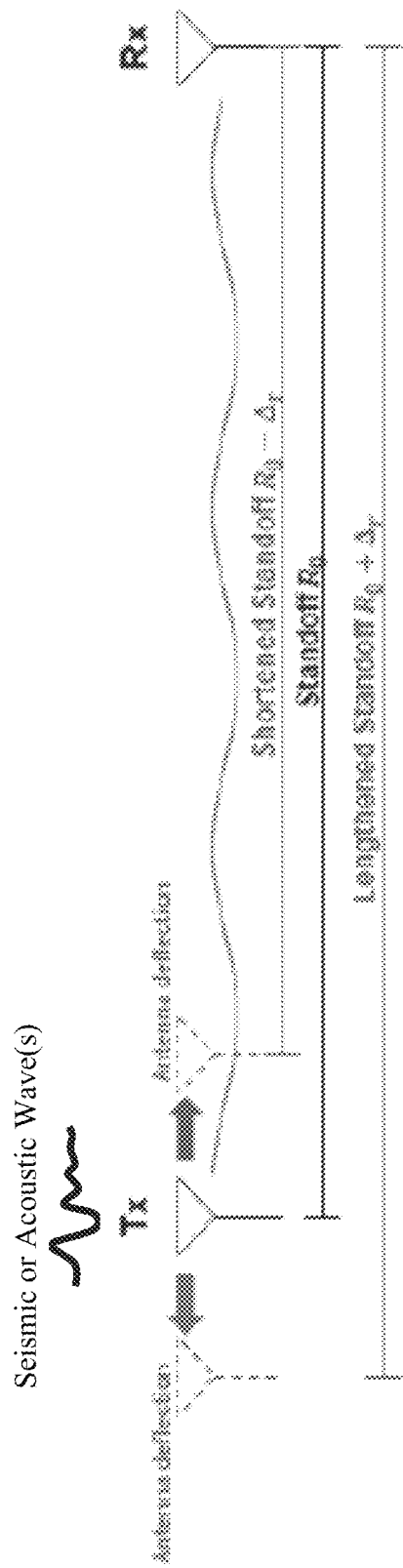
FIG. 9 provides an illustration that is useful for understanding fundamental principles of the direct passive phase change measurements and passive bistatic radar sensing.

Referring now to FIG. 9, there is provided an illustration that is useful for understanding fundamental principles of the direct passive phase change measurements (e.g., of system 106 in FIG. 1) and passive bistatic radar sensing (e.g., of system 116 of FIG. 1). As shown in FIG. 9, deflection of the transmitter Tx occurs in response to the seismic or acoustic waves (e.g., seismic or acoustic waves 108 of FIG. 1). This deflection changes a standoff between the transmitter Tx and receiver Rx. For example, prior to a seismic event, the transmitter Tx and receiver Rx are separated from each other by a distance $R_0$. Normal propagation delay $\tau_0$ of a signal is defined by the following mathematical equation.

$$\tau_0 = R_0/c$$

where c is the speed of light 299, 792, 458 m/sec. When the seismic event occurs, the transmitter Tx is deflected towards and away from the receiver Rx by a length $\Delta r$. The minimum propagation delay is defined by the following mathematical equation when the transmitter Tx is deflected towards the receiver Rx.

$$\tau_0 = (R_0 - \Delta r)/c$$

The maximum propagation delay is defined by the following mathematical equation when the transmitter Tx is deflected away from the receiver Rx.

$$\tau_0 = (R_0 + \Delta r)/c$$

The propagation delay can be generalized as follows: $\tau_- \leq \tau(t) \leq \tau_+$.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for detecting or predicting a seismic event, comprising:
    receiving, by a system, a plurality of communication signals using at least one carrier recovery component with a fixed location remote from one or more sources of the plurality of communication signals;
    selecting a communication signal from the plurality of communication signals based on (1) source location and (2) at least one of a signal frequency, a signal type and a signal content;

determining, by the system, one or both of (i) phase deviations of the selected communication signal over time and (ii) differential propagation delays over two paths which the selected communication signal or another one of the plurality of communication signals traveled;

performing, by the system, operations to detect patterns in one or both of the phase deviations and differential propagation delays that indicate an occurrence of seismic activity with a first level of confidence; and using, by the system, the first level of confidence to detect or predict the seismic event.

2. The method according to claim 1, wherein the one or more sources of the plurality of communication signals are located at or near the location of the seismic activity.

3. The method according to claim 2, wherein the one or more sources of the plurality of communication signals comprise a ground station, a base station or a broadcast station.

4. The method according to claim 1, wherein at least one of the patterns is detected using a machine learning algorithm.

5. The method according to claim 1, wherein the seismic event is detected or predicted using a combination of the first level of confidence determined based on the phase deviations and a second level of confidence determined based on the differential propagation delays.

6. A method for detecting or predicting a seismic event, comprising:
receiving, by a system, at least one communication signal using a carrier recovery component with a fixed location remote from a source of the at least one communication signal;

determining, by the system, one or both of (i) phase deviations of the at least one communication signal over time and (ii) differential propagation delays over two paths which the at least one communication signal traveled;

performing, by the system, operations to detect a pattern in one or both of the phase deviations and the differential propagation delays that indicates an occurrence of seismic activity with a first level of confidence;

using, by the system, the first level of confidence to detect or predict the seismic event; and performing active monostatic sensing to detect phase shifts in an electromagnetic signal over time and to detect a pattern in the phase shifts that indicate an occurrence of seismic activity with an another level of confidence, wherein the active monostatic sensing comprises radar-based sensing, LaDAR-based sensing, or both radar-based sensing and LaDAR-based sensing.

7. The method according to claim 1, wherein the seismic event is detected or predicted using an another level of confidence in addition to the first level of confidence.

8. The method according to claim 1, further comprising performing operations by the system to cause a robotic system to take an action for addressing the seismic event which was detected or predicted.

9. The method according to claim 1, wherein the phase deviations result from physical motion of a structure excited by a seismic or acoustic wave.

10. The method according to claim 1, wherein the plurality of communication signals comprises a satellite communication signal which was emitted from a ground station affected by the seismic event and retransmitted by a satellite over a downlink channel.

11. A system, comprising:
a carrier recovery component configured to receive a plurality of communication signals and having a fixed location remote from one or more sources of the plurality of communication signals; and
a circuit configured to:
select a communication signal from the plurality of communication signals based on (1) source location and (2) at least one or more of a signal frequency, a signal type and a signal content;
determine on or both of (i) phase deviations of the selected communication signal over time and (ii) differential propagation delays over two paths which the selected communication signal or another one of the plurality of communication signals traveled;
detect patterns in one or both of the phase deviations and differential propagation delays that indicate an occurrence of seismic activity with a first level of confidence; and
using the first level of confidence to detect or predict the seismic event.

12. The system according to claim 11, wherein the one or more sources of the plurality of communication signals are located at or near the location of the seismic activity.

13. The system according to claim 12, wherein the one or more sources of the plurality of communication signals comprise a ground station, a base station or a broadcast station.

14. The system according to claim 11, wherein at least one of the patterns is detected using a machine learning algorithm.

15. The system according to claim 11, wherein the seismic event is detected or predicted using a combination of the first level of confidence determined based on the phase deviations and a second level of confidence determined based on the differential propagation delays.

16. A system, comprising:
a carrier recovery component configured to receive at least one communication signal and having a fixed location remote from a source of the at least one communication signal; and
a circuit configured to:
determine one or both of (i) phase deviations of the at least one communication signal over time and (ii) differential propagation delays over two paths which the at least one communication signal traveled;
detect a pattern in one or both of the phase deviations and differential propagation delays that indicate an occurrence of seismic activity with a first level of confidence; and
using the first level of confidence to detect or predict the seismic event;
wherein the circuit is further configured to perform active monostatic sensing to detect phase shifts in an electromagnetic signal over time and to detect a pattern in the phase shifts that indicate an occurrence of seismic activity with another level of confidence, wherein the active monostatic sensing comprises radar-based sensing, LaDAR-based sensing, or both radar-based sensing and LaDAR-based sensing.

17. The system according to claim 11, wherein the seismic event is detected or predicted using an another level of confidence in addition to the first level of confidence.

18. The system according to claim 11, wherein the circuit is further configured to cause a robotic system to take an action for addressing the seismic event which was detected or predicted.

* * * * *